(12) United States Patent
Ding et al.

(10) Patent No.: US 9,191,290 B2
(45) Date of Patent: Nov. 17, 2015

(54) METHODS AND DEVICES FOR MONITORING A DATA PATH

(75) Inventors: Zhemin Ding, Stockholm (SE); Panagiotis Saltsidis, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/128,505

(22) PCT Filed: Jun. 19, 2012

(86) PCT No.: PCT/SE2012/050680
§ 371 (c)(1),
(2), (4) Date: Mar. 7, 2014

(87) PCT Pub. No.: WO2012/177213
PCT Pub. Date: Dec. 27, 2012

(65) Prior Publication Data
US 2014/0169179 A1  Jun. 19, 2014

Related U.S. Application Data

(60) Provisional application No. 61/498,775, filed on Jun. 20, 2011.

(51) Int. Cl.
*H04L 12/26* (2006.01)
(52) U.S. Cl.
CPC .......... *H04L 43/062* (2013.01); *H04L 43/0811* (2013.01); *H04L 43/10* (2013.01); *H04L 43/026* (2013.01)
(58) Field of Classification Search
CPC ....... H04L 43/062; H04L 12/26; H04L 12/56; H04L 12/28; H04L 2012/5658; H04L 2012/5679; H04L 41/22

USPC ......... 370/216, 217, 219, 225, 228, 229, 235, 370/241.1, 255, 258, 328, 329, 390, 392; 709/217
See application file for complete search history.

(56) References Cited

U.S. PATENT DOCUMENTS

2007/0014290 A1  1/2007  Dec et al.
2007/0025256 A1  2/2007  Hertoghs et al.
(Continued)

FOREIGN PATENT DOCUMENTS

WO   WO-2009049292 A1   4/2009

OTHER PUBLICATIONS

Wolf, Tilman; "In-Network Services for Customization in Next-Generation Networks"; IEEE Network, Jul./Aug. 2010.*
(Continued)

*Primary Examiner* — Jamal Javaid
*Assistant Examiner* — Wali Butt
(74) *Attorney, Agent, or Firm* — Nicholson de Vos Webster & Elliot LLP (57) ABSTRACT

The present invention relates to methods and devices for monitoring a data path extending from an originating node to a terminating node in a network. In a first aspect of the present invention, the method comprises the step of submitting, to the originating node, a request to monitor at least one network status parameter associated with a particular data flow transported on the data path. Further, the method comprises the step of submitting, to all nodes in the data path, a data flow identifier indicating the particular data flow being one out of a plurality of data flows that can be transported on the data path. Moreover, the method comprises the step of receiving, from at least one of the nodes in the data path, a response message comprising the requested at least one network status parameter.

13 Claims, 6 Drawing Sheets

(56) References Cited

U.S. PATENT DOCUMENTS

2008/0049621 A1* 2/2008 McGuire et al. ............ 370/236.2
2011/0222412 A1* 9/2011 Kompella .................. 370/241.1

OTHER PUBLICATIONS

International Search Report, International Application No. PCT/SE2012/050680, Feb. 28, 2013, 6 pages.
"Initial Split Architecture and Open Flow Protocol study", SPARC, ICT-258457, Deliverable 3.1, Oct. 2010, http://www.fp7-sparc.eu/home/deliverables/; whole document; abstract; See sections "executive summary", 3.2.5, 11, 49 pages.
"Update on Split Architecture for Large Scale Wide Area Networks", SPARC, ICT-258457, Deliverable D3.2, Dec. 2011, http://www.fp7-sparc.eu/home/deliverables/; whole document, 93 pages.
Das, Saurav, et al., "Unifying Packet and Circuit Switched Networks", 2009 IEEE Globecom Workshops, Nov. 30-Dec. 4, 6 pages.
International Preliminary Report on Patentability, International Application No. PCT/SE2012/050680, Dec. 23, 2013, 7 pages.
"Ethernet Protection Switching", Series G: Transmission Systems and Media, Digital Systems and Networks, Ethernet over Transport aspects—General aspects, Series Y: Global Information Infrastructure, Internet Protocol Aspects and, Next-Generation Networks, Internet protocol aspects—Transport, International Telecommunication Union, ITU-T Recommendation G.8031/Y.1342, Jun. 2006, 52 pages.
"OpenFlow Switch Specification", Version 1.1.0 Implemented (Wire Protocol 0x02), Feb. 28, 2011, 56 pages.
"Virtual Bridged Local Area Networks", Amendment 5: Connectivity Fault Management, IEEE Standard for Local and metropolitan area networks, IEEE Std 802.1ag™-2007, Dec. 17, 2007, 260 pages.

* cited by examiner

METHODS AND DEVICES FOR MONITORING A DATA PATH

CROSS-REFERENCE TO RELATED APPLICATIONS

This application is a National stage of International Application No. PCT/SE2012/050680, filed Jun. 19, 2012, which claims priority to U.S. Application No. 61/498,775, filed Jun. 20, 2011, which are hereby incorporated by reference.

TECHNICAL FIELD

The invention relates to methods and devices for monitoring a data path extending from an originating node to a terminating node in a network.

BACKGROUND

Ethernet service operation, administration and maintenance (OAM) is a key component of operation, administration and maintenance for carrier Ethernet. It specifies protocols, procedures and managed objects for end to end fault detection, verification and isolation. Ethernet service OAM defines a hierarchy of up to eight OAM levels, allowing users, service providers and operators to run independent OAMs at their own level. It introduces the concept of a maintenance association (MA) that is used to monitor the integrity of a single service instance by exchanging connectivity fault management (CFM) messages. The scope of a maintenance association is determined by the management domain (MD), which describes a network region where connectivity and performance is managed. Each MA associates two or more maintenance association endpoints (MEP) and allows maintenance association intermediate points (MIP) to support fault detection and isolation.

A continuity check protocol is used for fault detection. Each MEP can periodically transmit connectivity check messages (CCM) and track CCMs received from other MEPs in the same maintenance association.

A loopback message (LBM) is used for fault verification. It is typically performed after fault detection. It can also confirm successful initiation or restoration of connectivity. Loopback messages are transmitted by operator command. The receiving MEP or MIP respond to the LBM with a unicast loopback reply (LBR).

A multicast linktrace message (LTM) is transmitted in order to perform path discovery and fault isolation. The LTM is transmitted by operator command. The intercepting MEP or MIP sends a unicast linktrace reply (LTR) to the originator of the LTM. The originating MEP collects the LTRs and provides sufficient information to construct the sequence of MEPs or MIPs that would be traversed by a data frame sent to the target MAC address.

There are usually two types of Ethernet service performance management: delay measurement (DM) and loss measurement (LM).

DM is performed between a pair of MEPs. It can be used for on-demand measurement of frame delay and frame delay variation. A MEP maintains the timestamp at the transmission time of ETH-DM frame.

LM is performed between a pair of MEPs, which maintain two local counters for each peer MEP and for each priority class; TxFCl: counter for data frames transmitted towards the peer MEP, RxFCl: counter for data frames received from the peer MEP. OAM frames are not counted.

There are two types of multiprotocol label switching-transport profile (MPLS-TP) OAM.

The first method is to enhance the available MPLS OAM toolset to meet the OAM requirements of MPLS-TP. Labeled switched path (LSP) ping should be extended for working without internet protocol (IP), should include tracing functionality and should support point to multipoint LSPs. For bidirectional forwarding detection (BFD), the globally unique identifier should be enabled, BFD should be enabled to work on LSP without reliance on IP/user datagram protocol (UDP) functionality and BFD should also be extended to cover point-to-multipoint LSPs.

The second method is to develop MPLS-TP OAM based on Y.1731 Ethernet service OAM. The basic idea is that Y.1731 specifies a set of OAM procedures and related packet data unit (PDU) formats that meet the transport network requirements for OAM. The actual PDU formats are technology agnostic and could be carried over different encapsulations, e.g. MPLS Generic Associated Channel.

A control protocol known as OpenFlow provides a vendor agnostic interface for controlling network forwarding elements. The essence of OpenFlow is the separation of the control plane and data plane in routing and switching gear. The interface allows flexible deployment of the network control plane software, and simplifies the control plane on network forwarding hardware. The control plane can be deployed on a centralized controller that controls multiple forwarding elements which allows increased innovation in control plane software and simplified operations and management (O&M).

In the canonical OpenFlow architecture (see FIG. 1, from Open Flow Switch Specification version 1.0), the control plane in network switching and routing equipment is moved into a separate controller 10. The controller communicates over a secure channel with the switches 11 through the OpenFlow protocol. Software running on the controller "programs" the switches with flow specifications that control the routes of packets through the network. For routing purposes, the switches only need to run an OpenFlow control plane, considerably simplifying their implementation. The architecture allows the controller to run on a separate PC and control multiple switches, rather than having a distributed control plane with components that run on each switch.

Figure 1:
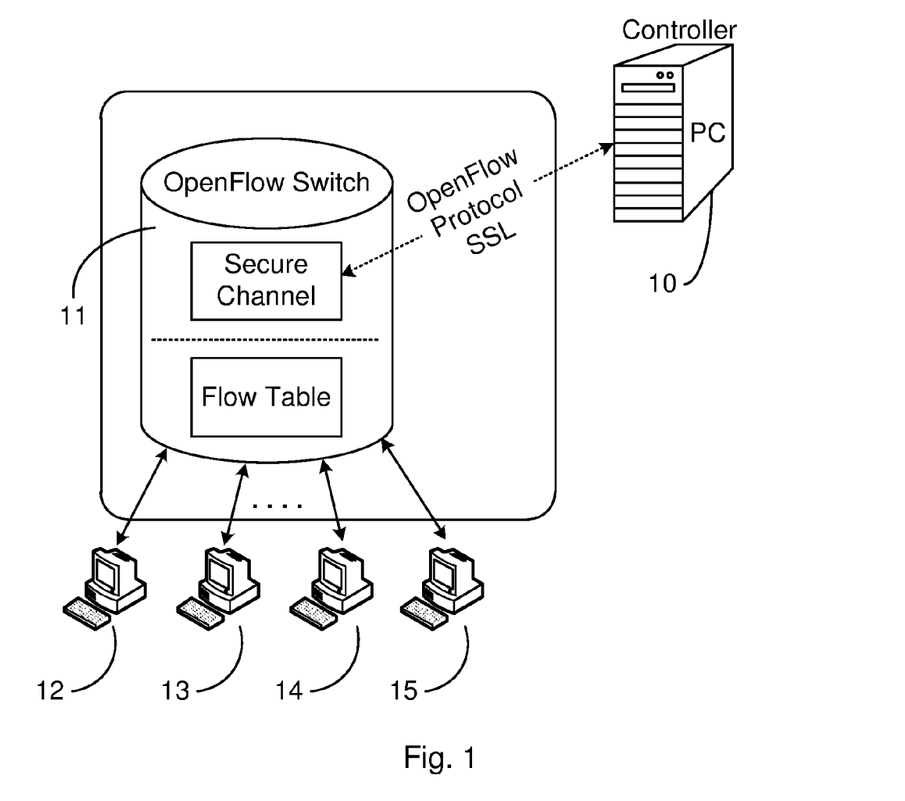
FIG. 1 illustrates a prior art OpenFlow architecture.

Switches are modeled as a flow table implementing e.g. firewalls, network address translation (NAT), quality of service (QoS), and to collect statistics. In the flow table, there are three columns: rules, actions, and counters. The rules column defines the flow. Rules are matched against the headers of incoming packets from network nodes 12, 13, 14, 15. If a rule matches, the actions from the action column are applied to the packet and the counters in the counter column are updated. If a packet matches multiple rules, the rule with the highest priority is applied.

The Internet has grown tremendously and the existing architecture has shown some weaknesses: the proprietary hardware design and supply, the single sourced system software supply closely coupled with equipment vendors, no application ecosystem for $3^{rd}$ party innovation exists, and so on. To address all those challenges, with reference to FIG. 2, a more elaborate split network architecture concept has been proposed, where data and control plane are split and a standardized interface is built between the controller 20 and data forwarding devices 21, 22, 23.

OpenFlow is one example of a split architecture platform. It is not yet carrier-grade and needs many extensions, where one important issue is OAM. There are several split architecture OAM challenges:

Mapping traditional OAMs; i.e. how to attain a generalized Split Architecture OAM for OAM types such as Ethernet OAM, MPLS OAM, and OAM tools for IP.

The virtualization enables many operators to use the same network, i.e. a multi-carrier service OAM scenario should be supported, and further OAM automatic configuration should provided in this environment.

The existing solutions for split architecture OAM simply copy the old OAM with static configuration. For example, again with reference to FIG. 2, to support Ethernet OAM, the Ethernet OAM modules are configured in every node 21, 22, 23. This configuration works well with Ethernet traffic flows. While split architecture (e.g. OpenFlow) can support various traffic flows such Ethernet, MPLS or IP, an Ethernet OAM is useless for monitoring an MPLS traffic flow and vice versa. The result will be different OAM configuration modules and OAM generator/parsing modules for different traffic flows. As a consequence, the complexity of data forwarding devices 21, 22, 23 will increase.

SUMMARY

An object of the present invention is to solve, or at least mitigate these problems in the art and provide an improved method and device for monitoring a data path in a network.

This object is attained in a first aspect of the present invention by a method for monitoring a data path extending from an originating node to a terminating node in a network. The method comprises the step of submitting, to the originating node, a request to monitor at least one network status parameter associated with a particular data flow transported on the data path. Further, the method comprises the step of submitting, to all nodes in the data path, a data flow identifier indicating the particular data flow being one out of a plurality of data flow types that can be transported on the data path. Moreover, the method comprises the step of receiving, from at least one of the nodes in the data path, a response message comprising the requested at least one network status parameter.

Advantageously, by having a network supervising device, such as e.g. a network controller, configuring a plurality of nodes forming a data path to be monitored in the network, it is possible to separate network monitoring data from data traffic transported on the data path. The network monitoring data is typically OAM related and subsequently brings about, after having traversed the data path, reporting of requested network status parameters necessary for managing the network from one or more nodes in the data path to the network controller. A request is made by the network controller to monitor a network status parameter associated with a particular data flow transported on the data path. For instance, the requested network status parameter could be "connectivity", i.e. the network controller may want to verify that connectivity exists between the nodes in the data path, and a request to that effect is sent to the originating network node. Further, different data flows can be transported on the data path, being for example Ethernet, MPLS, IP, or any other appropriate data flow. A data flow identifier, which typically is based on a set of fields in a data packet header, and which identifies the particular data flow associated with the requested parameter, is transmitted from the network controller to the nodes in the data path. This data flow identifier corresponds to the one used for the monitored data traffic, thus securing that the network monitoring (OAM) data will be on the same path as the monitored data traffic. The OAM data is distinguished from the data traffic by a field in the data packet header, for example the Ethertype, which should not be used as a part of the set of fields that are associated with the flow identifier. It is thus possible for the network nodes to distinguish between regular data traffic from OAM traffic and process the requested parameters pertaining to network monitoring data. Further advantageous is that the network controller consequently enables for the nodes to handle OAM for different types of data flows without having to implement separate modules managing the different data flow types. In the present example, one or more of the nodes in the data path will report to the network controller whether they have connectivity or not.

This object is attained in a second aspect by a method for monitoring a data path extending from an originating node to a terminating node in a network. The method comprises the steps of receiving, at the originating node from a network controller, a request to monitor at least one network status parameter associated with a particular data flow transported on the data path, and a data flow identifier indicating the particular data flow being one out of a plurality of data flow types that can be transported on the data path, and determining from the received request whether a response message comprising the requested at least one network status parameter should be reported to the network controller and if so, transmitting the response message to the network controller. The method further comprises the step of generating network monitoring data on the basis of the received data flow identifier, such that the generated network monitoring data is transported on the same path as the particular data flow, and including the data flow identifier in the network monitoring data, which generated network monitoring data comprises instructions regarding the monitoring of the requested at least one network status parameter. Moreover, the method comprises the step of submitting, to a first subsequent node in the data path, the generated network monitoring data.

Advantageously, by having the originating node in the data path receive a request from the network controller to monitor a network status parameter associated with a particular data flow transported on the data path, as well as a data flow identifier, the originating node can generate network monitoring data on the basis of the received data flow identifier. Thus, the originating node can generate network monitoring data in the form of a "standard" OAM instruction for the particular data flow, such that e.g. the format and parsing of the network monitoring data complies with the data flow. For instance, in line with the example given in the first aspect of the present invention, the requested network status parameter could be "connectivity", i.e. the network controller may want to verify that connectivity exist between the nodes in the data path, and a request to that effect is sent to the originating network node. Further, a number of different data flows can be transported on the data path, for example Ethernet, MPLS, IP, or any other identified data flow. If the network controller request a report of connectivity in the data path through the initiation of a loopback command to a certain node along the data flow path, the originating node generates a loopback message to the target node and includes the data flow identifier with the message (or alternatively associates the data flow identifier with the loopback message) to generate the network monitoring data. The originating node may further itself report its connectivity status if requested to do so by the network controller. Finally, the originating node submits the generated network monitoring data to a first subsequent node in the data path for further data path monitoring. Again, the OAM data is distinguished from the data traffic by a field in the packet header, for example the Ethertype, which should not be used as a part of the set of fields that are associated with the flow identifier. It is thus possible for the network nodes to distinguish regular data traffic from OAM traffic and process the network monitoring data, i.e. OAM data. Further advantageous is that the network controller consequently enables for the nodes to handle OAM for different types of data flows without having to implement separate modules managing the different data flow types.

This object is attained in a third aspect by a method for monitoring a data path extending from an originating node to a terminating node in a network. The method comprises the steps of receiving, from a preceding node in the data path, network monitoring data comprising instructions regarding the monitoring of a requested at least one network status parameter and a data flow identifier, and receiving, from a network controller, the data flow identifier indicating a particular data flow being one out of a plurality of data flow types that can be transported on the data path. The method further comprises the steps of monitoring the received data flow identifier in order to process the received network monitoring data in accordance with the requirements of said particular data flow transported on the data path, and determining from the network monitoring data whether a response message comprising the requested at least one network status parameter should be reported to the network controller and/or the originating node and if so, transmitting the response message to the network controller and/or the originating node respectively. Moreover, in case a subsequent node exists in the data path, the method comprises the step of submitting, to the subsequent node in the data path, the generated network monitoring data for further data path monitoring.

Advantageously, by receiving network monitoring data from a preceding data path node with instructions regarding the monitoring of the originally requested network status parameter associated with a particular data flow transported on the data path, as well as a data flow identifier from the network controller, the receiving node can straightforwardly report the requested network status parameter to the network controller. Thus, the receiving node can interpret network monitoring data in the form of a "standard" OAM instruction for the particular data flow, such that e.g. the format and parsing of the network monitoring data complies with the data flow. For instance, in line with the example given in the first and second aspects of the present invention, the requested network status parameter could be "connectivity", i.e. the network controller may want to verify that connectivity exist between the nodes in the data path, and a request to that effect is sent to the originating network node. Further, a number of different data flows can be transported on the data path. If the network controller request a report of connectivity in the data path, through the initiation of a loopback command to a certain node along the data flow path, the originating node generates a standard loopback message and includes the data flow identifier with the message (or alternatively associates the data flow identifier with the loopback message) to generate the network monitoring data. The originating node may further itself report its connectivity status if requested to do so by the network controller. Then, the originating node submits the generated network monitoring data to the receiving node in the data path for further data path monitoring. When receiving the loopback message, it replies to the network controller with a standard OAM message in the from of a loopback reply. As previously has been discussed, the OAM data is distinguished from the data traffic by its identification by a field in the data packet header, for example the Ethertype, which should not be used as a part of the set of fields that are associated with the flow identifier. It is thus possible for the network nodes to distinguish between regular data traffic and OAM traffic and process the network monitoring data, i.e. OAM data. Further advantageous is that the network controller consequently enables for the nodes to handle OAM for different types of data flows without having to implement separate modules managing the different data flow types. In case a subsequent node exists in the data path, i.e. in case the receiving node is not the terminating node, the generated network monitoring data is submitted to the subsequent node for further data path monitoring.

An embodiment of the present invention combines the subject-matter of the second and third aspects of the present invention for creating a set of nodes forming the data path to be monitored in the network. Again, a method for monitoring a data path extending from an originating node to a terminating node in a network is provided. The method comprises the steps of receiving, at the originating node, a request from a network controller to monitor at least one network status parameter associated with a particular data flow transported on the network and identified by the same data flow identifier (which generally is based on a set of fields in the packet header) as the monitored data traffic, and receiving, at all nodes in the data path, the data flow identifier from the network controller indicating the particular data flow being one out of a plurality of data flows that can be transported on the data path. Further, the method comprises the steps of generating, at the originating node, network monitoring data on the basis of the received data flow identifier such that the generated network monitoring data is transported on the same path as the monitored data, and including the data flow identifier in the network monitoring data, which generated network monitoring data comprises instructions regarding the monitoring of the requested at least one network status parameter, and submitting, from the originating node to a first subsequent node in the data path, the generated network monitoring data. Moreover, the method comprises the steps of monitoring, at the first subsequent node, the data flow identifier and a field in the packet header, for example the Ethertype, distinguishing the OAM traffic from regular data traffic, in order to process the generated network monitoring data, and determining, at the first subsequent node, from the network monitoring data whether a response message comprising the requested at least one network status parameter should be reported to the requesting party and if so, transmitting the response message to the requesting party. Finally, in case the first subsequent node is not the terminating node, the method comprises the step of submitting, from the first subsequent node to a second subsequent node in the data path, the generated network monitoring data, which second subsequent node repeats the steps undertaken at said first subsequent node.

This embodiment of the present invention combines the advantages set forth in connection to the description in the above of the second and third aspects of the present invention.

In a fourth aspect of the present invention, a network controller is provided performing the steps of the method of the first aspect of the present invention.

In a fifth aspect of the present invention, an originating node is provided performing the steps of the method of the second aspect of the present invention.

In a sixth aspect of the present invention, a receiving node is provided performing the steps of the method of the third aspect of the present invention.

Still a further embodiment of the present invention combines the subject-matter of the first, second and third aspects of the present invention for creating a network controller separated from the data path, and a set of nodes forming the data path to be monitored in the network.

This embodiment of the present invention combines the advantages set forth in connection to the description in the above of the first, second and third aspects of the present invention.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

FIG. 1 illustrates a prior art OpenFlow architecture previously discussed.

Figure 2:
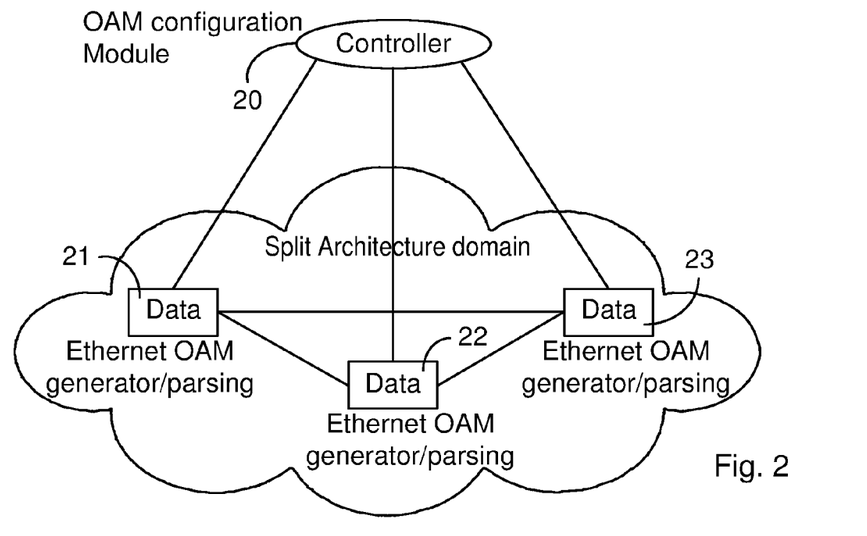
FIG. 2 illustrates a prior art split network architecture concept.

FIG. 2 illustrates a prior art split network architecture concept previously discussed.

Figure 3:
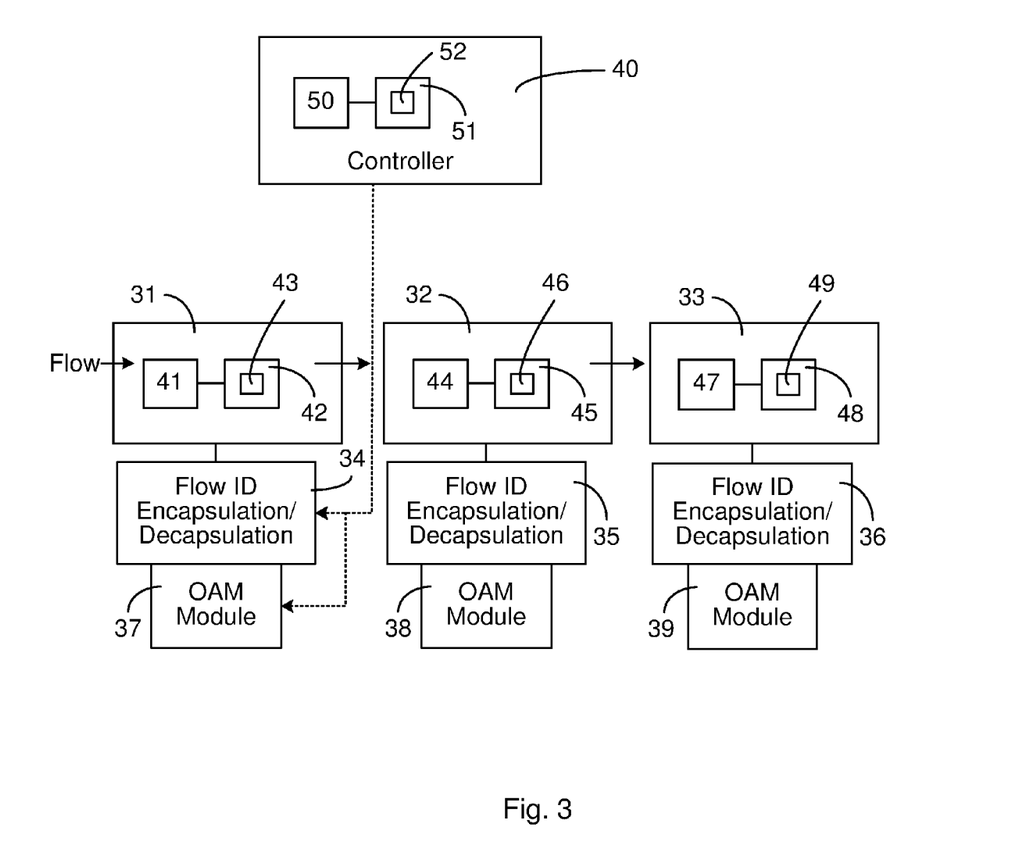
FIG. 3 illustrates a group of network nodes forming a data path along which network monitoring data is transported according to an embodiment of the present invention.

FIG. 3 illustrates a group of network nodes forming a data path along which network monitoring data is transported according to an embodiment of the present invention. To exemplify, the data path 30 extends from an originating node 31, via a subsequent, intermediate node 32 to a terminating node 33. Each node functionally comprises a module for managing data flow identifiers referred to as a Flow ID Encapsulation/Decapsulation block 34, 35, 36 and a functional block for managing network monitoring data in the form of OAM data referred to as OAM modules 37, 38, 39. The network nodes could be embodied in the form of Ethernet bridges, IP routers or general data traffic switches. Further, a network controller 40 is used for configuring the network nodes 31, 32, 33 and instructing the nodes to monitor desired network status parameters. The network controller 40 is separated from the data path 30 formed by the originating node 31, the subsequent node 32 and the terminating node 33. Further, the network controller 40 may be remotely located from the network nodes. However, it could also be envisaged that the network controller is located close to one or more of the network nodes, or even arranged within a network node such as the originating node 31. However, the network controller is logically separated from the data path 30.

In practice, steps of embodiments of the present invention undertaken at the respective node 31, 32, 32 and the network controller 40 are performed by a respective processing unit 41, 44, 47, 50 embodied in the form of one or more microprocessors arranged to execute a respective computer program 43, 46, 49, 52 downloaded to a suitable storage medium 42, 45, 48, 51 associated with the microprocessor, such as a Random Access Memory (RAM), a Flash memory or a hard disk drive. The processing unit 41 is arranged to at least partly carry out the method according to embodiments of the present invention when the appropriate computer program 43 comprising computer-executable instructions is downloaded to the storage medium 42 and executed by the processing unit 41. The storage medium 42 may also be a computer program product comprising the computer program 43. Alternatively, the computer program 43 may be transferred to the storage medium 42 by means of a suitable computer program product, such as a floppy disk or a memory stick. As a further alternative, the computer program 43 may be downloaded to the storage medium 42 over a network. The processing unit 41 may alternatively be embodied in the form of an application specific integrated circuit (ASIC), a field-programmable gate array (FPGA), a complex programmable logic device (CPLD), etc. The above description can correspondingly be applied to the respective processing unit, storage medium and computer program of the network controller 40, the intermediate node 32 and the terminating node 33.

In embodiments of the present invention, the OAM monitoring traffic is decoupled from the actual split architecture flow traffic (Ethernet, MPLS, IP or any other data flow type). Thus, the OAM modules 37, 38, 39 implemented by means of the respective processing unit 41, 44, 47 are independent from, the data traffic. The independent OAM modules 37, 38, 39 only generates or parses network monitoring data in the form of OAM protocol data units (PDUs). To create a "fate sharing" path between the actual data traffic flow and OAM flow, Flow ID encapsulation/decapsulation modules 34, 35, 36 are implemented by the respective processing unit 41, 44, 47. The Flow ID, which is based on a set of fields in the data packet header, is associated with actual data traffic flow to be monitored so that the OAM traffic will have the same Flow ID and pass through the same link and the same node as the data traffic flow.

Different OAM technologies mainly have similar goals for the occurrence of a fault or failure in the network: namely to detect, locate and report the fault. In the network architectures known in the art, as the control plane and data forwarding plane are closely coupled together, different OAM must be implemented for different traffic, e.g. Ethernet OAM monitors Ethernet Traffic; MPLS OAM monitors MPLS traffic; IP OAM monitors IP traffic, and so on. While it is different in a split architecture domain when the control plane is decoupled from the data forwarding plane, different traffic flows (Ethernet, MPLS or IP) are all treated equally by the data forwarding devices and only the network controllers know the differences between the different traffic flows.

There are issues related to the decoupling of the OAM monitoring traffic from the actual data flow traffic. Firstly, OAM traffic should be congruent with the data traffic (i.e. fate sharing should be implemented), meaning that the OAM traffic must go through same link, same node and using the same filtering table as the data traffic to be monitored. Secondly, some OAM may have technology specific OAM requirements.

Figure 4:
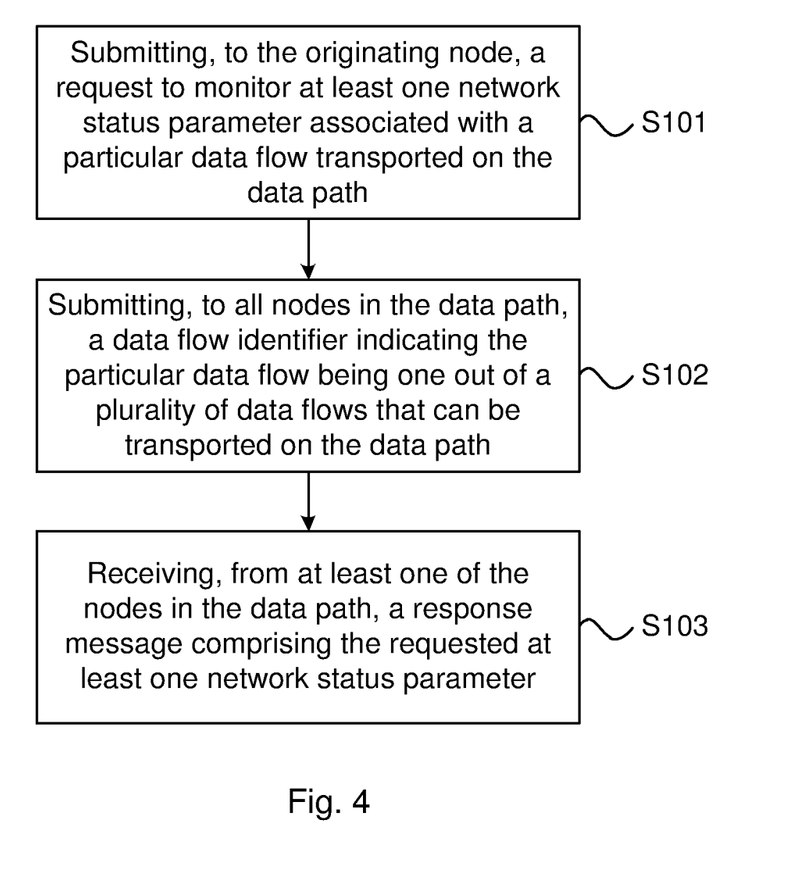
FIG. 4 shows a flowchart illustrating a method for monitoring a data path extending from an originating node to a terminating node in a network according to an embodiment of the present invention, which method is undertaken at a network controller.

Embodiments of the present invention which has been previously described, and further will be described in the following with reference made to appropriate drawings, show independent OAM modules 37, 38, 39 which is not associated with data traffic transported on the data path 30. These independent OAM modules only generate or parse OAM PDU. To create a fate sharing coupling between the actual data traffic flow and OAM flow, Flow ID encapsulation/decapsulation modules 34, 35, 36 are utilized at the respective network node 31, 32, 33 in the data path 30. These Flow ID modules are associated with the data traffic flow to be monitored so that the OAM traffic will have the same data flow identifier and pass through the same link and the same node as the data traffic flow. The OAM data is distinguished from the data traffic by a field in the data packet header, for example the Ethertype, which should not be used as a part of the set of fields that are associated with the flow identifier. It is thus possible for the network nodes to distinguish between regular data traffic from OAM traffic and process the requested parameters pertaining to network monitoring data FIG. 4 shows a flowchart illustrating a method for monitoring a data path extending from an originating node to a terminating node in a network according to an embodiment of the present invention, which method is undertaken at the network controller 40. In a first step, S101, the processing unit 50 of the network controller (being e.g. a server) submits, to the originating node 31, a request to monitor at least one network status parameter associated with a particular data flow transported on the data path. For instance, the network controller 40 may want the connectivity status of a specific flow in the network comprising nodes 31, 32, 33. Then in step S102, the network controller submits, to all nodes 31, 32, 33 in the data path 30, a data flow identifier indicating the particular data flow, being one out of a plurality of data flows, that can be transported on the data path. This is to couple the network monitoring data subsequently to be transported on the data path with the actual data traffic, such that the network monitoring data is transported on the same data path 30 as the monitored data. In step S103, when the respective network node 31, 32, 33 has received network monitoring data comprising instructions on which network status parameter to report, the network controller 40 receives, from at least one of the nodes in the data path, a response message comprising the requested at least one network status parameter.

Figure 5:
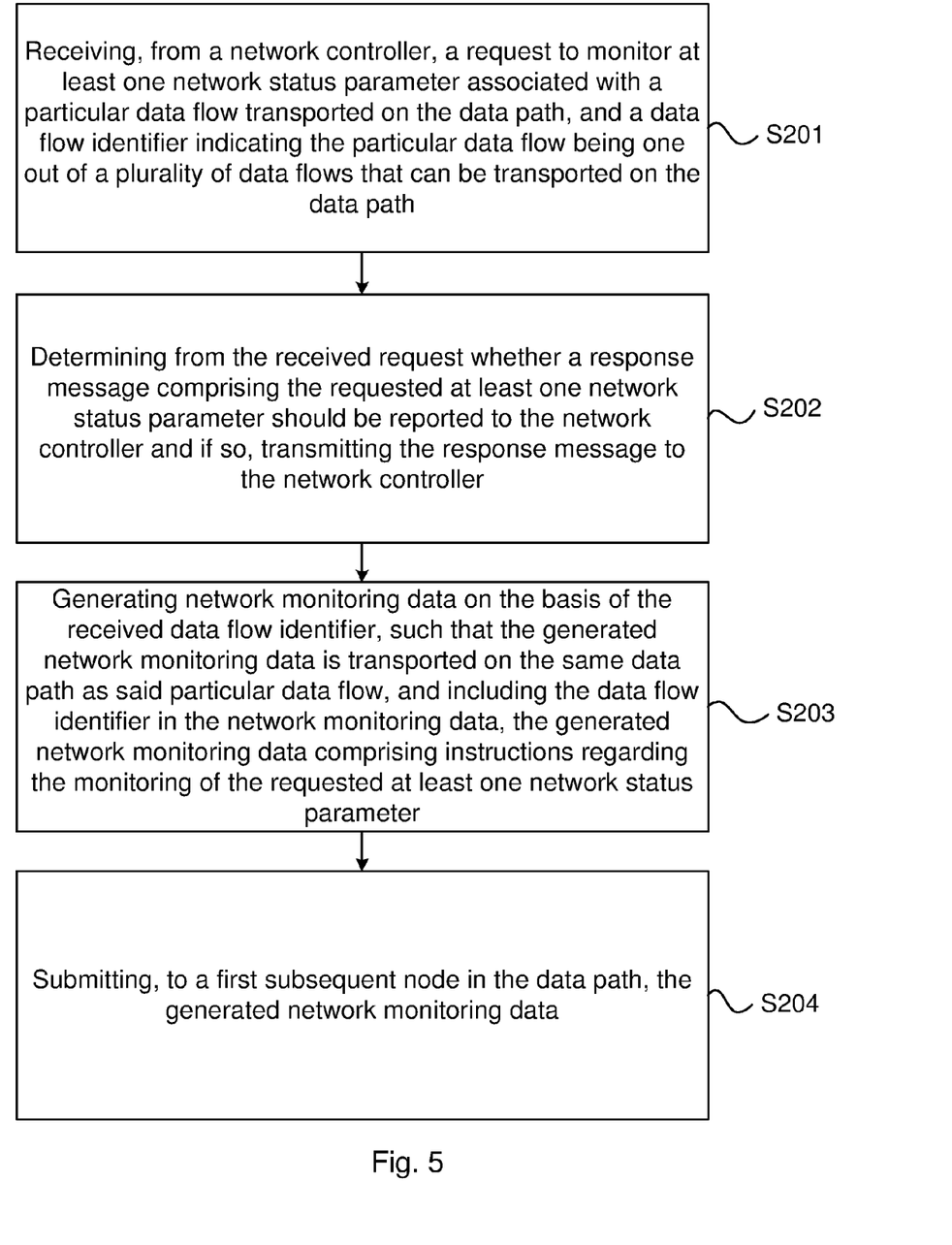
FIG. 5 shows a flowchart illustrating a method for monitoring a data path extending from an originating node to a terminating node in a network according to an embodiment of the present invention, which method is undertaken at the originating node.

FIG. 5 shows a flowchart illustrating a method for monitoring a data path extending from an originating node to a terminating node in a network according to an embodiment of the present invention, which method is undertaken at the originating node 31. In a first step, S201, the processing unit 41 of the originating node 31 (being e.g. an Ethernet bridge, an IP router or any other appropriate data traffic switch) receives, from the network controller 40, a request to monitor at least one service status parameter, frame loss, associated with a particular data flow, transported on the data path, and a data flow identifier indicating the particular data flow being one out of a plurality of data flows that can be transported on the data path. Then, in step S202, the originating node 31 determines from the received request whether a response message comprising the requested service status parameter, frame loss, should be reported to the network controller 40 and if so, transmitting the response message to the network controller. It should be noted that the network controller not necessarily is interested in the frame loss of the originating node 31, but could for instance exclusively be interested in frame loss of the terminating node 33. In step S203, the originating node 31 generates network monitoring data on the basis of the received data flow identifier, such that the generated network monitoring data complies with requirements of said particular type of data flow transported on the data path. Thus, the processing unit 41 maps the received data flow identifier, being for example a unique number, to data in the Flow IF encapsulation/decapsulation module 34 to determine which particular data flow the requested parameter is associated. Then, from the OAM module 37, the processing unit 41 generates a standard OAM message accomplishing this particular request from the network controller, i.e. to report frame. With the OAM message comprising instructions regarding the monitoring of the requested service status parameter, the data flow identifier is included. Finally, in step S204, the generated network monitoring data (i.e. the standard OAM message including the data flow identifier) is submitted to the subsequent node 32 in the data path 30.

Figure 6:
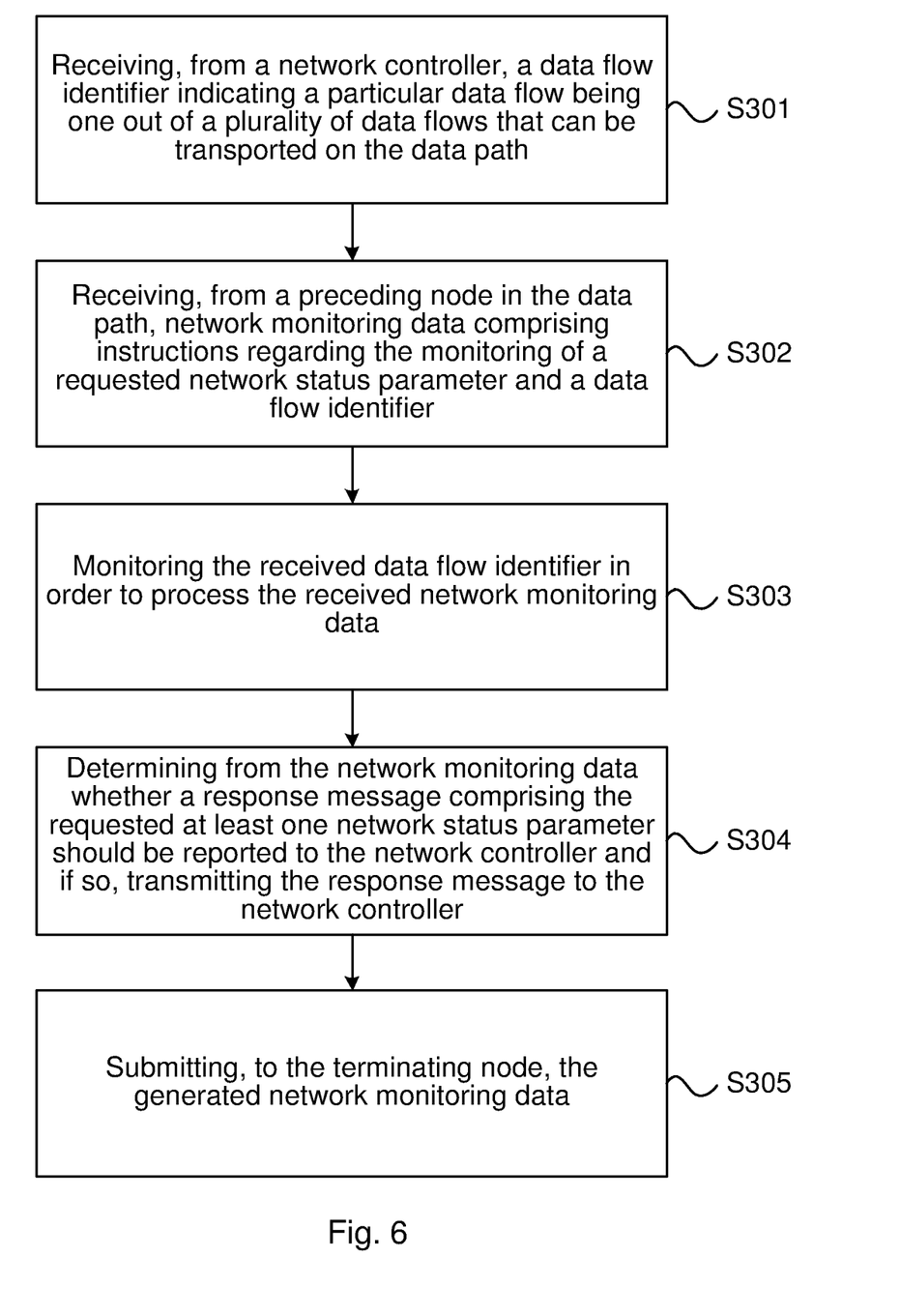
FIG. 6 shows a flowchart illustrating a method for monitoring a data path extending from an originating node to a terminating node in a network according to an embodiment of the present invention, which method is undertaken at a node receiving network monitoring data.

FIG. 6 shows a flowchart illustrating a method for monitoring a data path extending from an originating node to a terminating node in a network according to an embodiment of the present invention, which method is undertaken at a node receiving network monitoring data, i.e. either the intermediate node 32 or the terminating node 33 the originating node 31. In the following exemplifying embodiment, it will be assumed that the method is performed at the intermediate node 32. In a first step, S301, the processing unit 41 of the originating node 31 (being e.g. an Ethernet bridge, an IP router or any other appropriate data traffic switch) receives, from the network controller 40, a data flow identifier indicating a particular data flow being one out of a plurality of data flows that can be transported on the data path. Then, in step S302, the intermediate node 32 receives, from the originating node 31, network monitoring data comprising instructions regarding the monitoring of a requested network status parameter and a data flow identifier. Thus, the intermediate node 32 receives, in this particular example in line with the description in connection to FIGS. 4 and 5, a standard OAM message comprising the instruction to report service data and a data flow identifier indicating the data transported on the data path. This is enabled since the intermediate node previously receives the data flow identifier from the network controller 40 and thus can use the Flow ID encapsulation/decapsulation module 35 to map the data flow identifier received from the originating node 31 with that received from the network controller 40 to ensure what type of data flow is transported on the data path. As a consequence, in step S303, the received data flow identifier and a field in the packet header distinguishing the OAM traffic from regular data traffic are monitored in order to process the received network monitoring data. Hence, in step S304, the processing unit 44 turns to the OAM module 38 to determine which actions to take (in this case "report frame loss"), i.e. the intermediate node 32 determines from the network monitoring data whether a response message comprising the requested network status parameter should be reported to the network controller 40 and if so, transmits the response message to the network controller. Finally, in step S305, the generated network monitoring data is submitted to the terminating node 33, which node repeats the steps undertaken at the intermediate node 32 (except for forwarding the network monitoring data, since the terminating node 33 is the final node in the data path 30).

Figure 7:
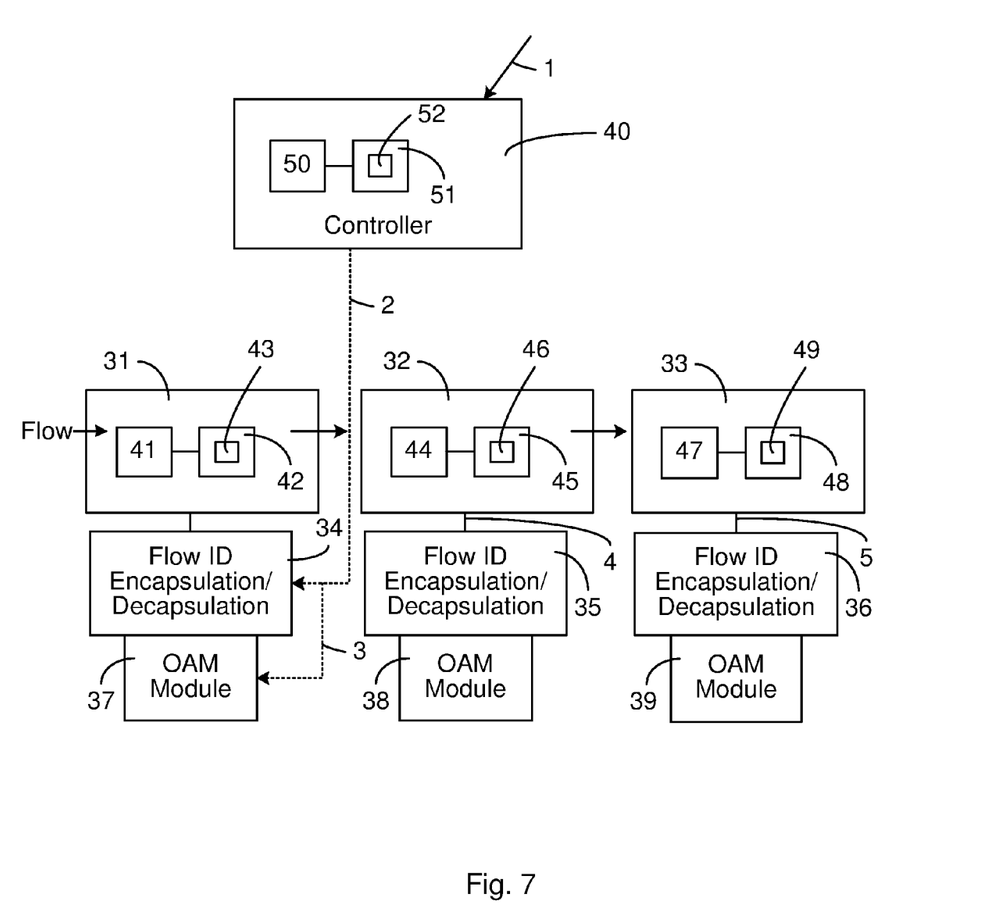
FIG. 7 illustrates a further embodiment of the present invention, in which CCM configuration of the network nodes is undertaken.

With reference to FIG. 7, a further embodiment of the present invention will be described. FIG. 7 illustrates in detail CCM configuration of the network nodes 31, 32, 33 forming the data path 30.

1. An OAM configuration module (not shown) in the network controller 40 receives a network management command: monitor traffic flow with certain parameters, e.g. Flow ID may indicate Virtual Local Area Network (VLAN) or MPLS, from the originating node 31 to the terminating node 33. The OAM configuration module also manually or dynamically generates the corresponding MD, MA, MEP and MIP.

2. The network controller 40 populates the Flow ID encapsulation/decapsulation modules 34, 35, 36 of the respective network node 31, 32, 33 based on the traffic flow information which is to be monitored, for example, if the traffic flow is MPLS, the OAM PDU must be encapsulated with the correct Flow ID (i.e. contain an MPLS label). In other words, the network controller 40 submits a request to monitor a network status parameter to the originating node 31 and a data flow identifier to all network nodes.

3. The OAM module 37 in the originating node 31 generates OAM packet template and fill the fields of OAM PDU such as OAM Protocol ID, MD, MEP, etc. In this case, OAM module will create a CCM OAM PDU (i.e. network monitoring data complying with requirements set by known OAM specifications). This OAM PDU is fed into Flow ID module which encapsulates this OAM PDU with correct Flow IDs (e.g. Ethernet MAC, VLAN or MPLS Label) based on information on the Flow ID encapsulation/decapsulation module 34. In this particular example, since the generated network monitoring data is embodied in the form of a CCM OAM PDU, i.e. an instruction to the terminating node 33 to detect loss of continuity or incorrect network connections, the originating node 31 will not transmit a response message to the network node 40. Thereafter, the CCM OAM PDU is submitted to the intermediate node 32.

4. When the intermediate node 32 receives traffic flow from the originating node 31, the traffic flow will be matched against a default flow table which has a special flow entry to guide traffic flow with OAM type (e.g. OAM Ethertype) to the Flow ID module 35. The intermediate node 32 has received from the network controller 40 a data flow identifier indicating a particular type of data flow. The Flow ID module will strip the Flow ID received from the originating node 31 and send the network monitoring data, i.e. the OAM PDU, to the OAM Module 38 for further processing in line with requirements of the data flow type specified by the Flow ID. In this case, OAM PDU is a CCM OAM PDU so the intermediate node 32 will not process this OAM PDU and it is thus determined that no response message should be sent to the network controller 40. The OAM PDU will be sent back to the normal traffic flow path for transmission to the terminating node 33.

5. When the terminating node 33 receives the traffic flow from the intermediate node 32, the traffic flow will be matched against a default flow table which has a special flow entry to guide traffic flow with a particular OAM Type (e.g. OAM Ethertype) to the Flow ID module 36. The process undertaken under item 4 for the intermediate node 32 will be repeated for the terminating node 33. Thus, the Flow ID module 36 will strip the Flow ID from the network monitoring data and send the remaining OAM PDU to the OAM Module 39 for further processing. In this case, the OAM module 39 recognizes that the terminating node 33 is the destination of this CCM OAM PDU. The OAM module processes the OAM PDU to detect if there is a problem, and the processing unit 47 of the terminating node 33 will submit a response message comprising the requested network status parameter to the network controller 40. In this particular example, the processing unit reports, after having processed the CCM OAM PDU, whether there are loss of continuity or incorrect network connections.

This is a general Flow OAM mechanism for split architecture. In practice, all the existing implementation in IEEE 802.1ag and Y.1731 can be reused. For example, the OAM PDU can be based on Ethernet OAM while the actual traffic can be MPLS or IP or Ethernet. OAM ID can be Ethernet OAM Ethertype: 0X8902 or a new Flow OAM type for differentiating between legacy OAM and new OAM.

For technology specific OAM requirements which the Ethernet OAM PDU can not satisfy, it is envisaged that new PDU types can be defined to extend the functionality. It is further possible to use MPLS BFD as the basis for the Flow OAM PDU.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method for monitoring a data path extending from an originating node to a terminating node in a network, the method comprising:

receiving, at the originating node from a network controller separated from the data path, a request to monitor at least one network status parameter associated with a particular data flow transported on the data path, and a data flow identifier indicating the particular data flow being one out of a plurality of data flows that can be transported on the data path;

determining from the received request whether a response message comprising the requested at least one network status parameter should be reported to the network controller and if so, transmitting the response message to the network controller;

generating network monitoring data based on the received data flow identifier, wherein the network monitoring data being an operation, administration and maintenance (OAM) packet data unit (PDU), such that the generated network monitoring data is transported on a same data path as the particular data flow, and including the data flow identifier in the network monitoring data, the generated network monitoring data comprising instructions regarding monitoring of the requested at least one network status parameter; and submitting, to a first subsequent node in the data path, the generated network monitoring data, and wherein in case the first subsequent node is not the terminating node, submitting, from the first subsequent node to a second subsequent node in the data path, the generated network monitoring data.

2. The method of claim 1, further comprising:

receiving, at all nodes in the data path, the data flow identifier from the network controller indicating the particular data flow being one out of a plurality of data flows that can be transported on the data path;

monitoring, at the first subsequent node, the data flow identifier in order to process the generated network monitoring data;

determining, at the first subsequent node, from the network monitoring data whether a response message comprising the requested at least one network status parameter should be reported to a requesting party and if so, transmitting the response message to the requesting party, wherein the second subsequent node repeats steps undertaken at the first subsequent node.

3. A method for monitoring a data path extending from an originating node to a terminating node in a network, the method comprising:

receiving, from a network controller separated from the data path, a data flow identifier indicating a particular data flow being one out of a plurality of data flows that can be transported on the data path;

receiving, from a preceding node in the data path, network monitoring data comprising instructions regarding the monitoring of a requested at least one network status parameter and the data flow identifier;

monitoring the received data flow identifier in order to process the received network monitoring data;

determining based on the processed network monitoring data whether a response message comprising the requested at least one network status parameter should be reported to the network controller and if so, transmitting the response message to the network controller, the network monitoring data being an operation, administration and maintenance (OAM) packet data unit (PDU); and in case a subsequent node exist in the data path, submitting, to the subsequent node in the data path, the processed network monitoring data.

4. The method of claim 3, the data flow identifier indicating a particular data flow being one out of a plurality of data flows that can be transported on the data path indicates one of an Ethernet, multiprotocol label switching (MPLS), and Internet protocol (IP) data flow.

5. An originating node for monitoring a data path extending from the originating node to a terminating node in a network, wherein the originating node comprises a processing unit being arranged to:

receive, from a network controller separated from the data path, a request to monitor at least one network status parameter associated with a particular data flow transported on the data path, and a data flow identifier indicating the particular data flow being one out of a plurality of data flows that can be transported on the data path;

determine from the received request whether a response message comprising the requested at least one network status parameter should be reported to the network controller and if so, transmitting the response message to the network controller;

generate network monitoring data based on the received data flow identifier, wherein the network monitoring data being an operation, administration and maintenance (OAM) packet data unit (PDU), such that the generated network monitoring data complies with requirements of a type of the particular data flow transported on the data path, and including the data flow identifier in the network monitoring data, the generated network monitoring data comprising instructions regarding the monitoring of the requested at least one network status parameter; and submit, to a first subsequent node in the data path, the generated network monitoring data, wherein in case the first subsequent node is not the terminating node, the first subsequent node is to submit to a second subsequent node in the data path, the generated network monitoring data.

6. A group of network nodes for monitoring a data path extending from an originating node to a terminating node in a network, the group of network nodes comprising:

an originating node comprising a processing unit being arranged to:

receive, from a network controller separated from the data path, a request to monitor at least one network status parameter associated with a particular data flow transported on the data path, and a data flow identifier indicating said particular data flow being one out of a plurality of data flows that can be transported on the data path;

determine from the received request whether a response message comprising the requested at least one network status parameter should be reported to the network controller and if so, transmitting the response message to the network controller;

generate network monitoring data based on the received data flow identifier, wherein the network monitoring data being an operation, administration and maintenance (OAM) packet data unit (PDU), such that the generated network monitoring data complies with requirements of a type of the particular data flow transported on the data path, and including the data flow identifier in the network monitoring data, the generated network monitoring data comprising instructions regarding the monitoring of the requested at least one network status parameter; and submit, to a first subsequent node in the data path, the generated network monitoring data; and the first subsequent node forming part of the data path, the first subsequent node comprising a processing unit being arranged to:

receive a data flow identifier from the network controller indicating the particular data flow being one out of a plurality of data flows that can be transported on the data path;

monitor the data flow identifier in order to process the generated network monitoring data;

determine from the network monitoring data whether a response message comprising the requested at least one network status parameter should be reported to the network controller and if so, transmitting the response message to the network controller; and in case the first subsequent node is not the terminating node, submit, from the first subsequent node to a second subsequent node in the data path, the generated network monitoring data, which second subsequent node repeats steps undertaken at the first subsequent node.

7. A receiving node for monitoring a data path extending from an originating node to a terminating node in a network, the receiving node forms part of the data path, the receiving node comprising a processing unit being arranged to:

receive, from a network controller separated from the data path, a data flow identifier indicating a particular data flow being one out of a plurality of data flows that can be transported on the data path;

receive, from a preceding node in the data path, network monitoring data comprising instructions regarding the monitoring of a requested at least one network status parameter and the data flow identifier;

monitor the received data flow identifier in order to process the received network monitoring data;

determine based on the processed network monitoring data whether a response message comprising the requested at least one network status parameter should be reported to the network controller and if so, transmitting the response message to the network controller wherein the network monitoring data being an operation, administration and maintenance (OAM) packet data unit (PDU); and, in case a subsequent node exist in the data path; and submit, to the subsequent node in the data path, the processed network monitoring data.

8. The receiving node of claim 7, the node being one of an Ethernet bridge, IP router or data traffic switch.

9. The receiving node of claim 7, the data flow identifier indicating a particular data flow being one out of a plurality of data flows that can be transported on the data path indicates one of an Ethernet, multiprotocol label switching (MPLS), and Internet protocol (IP) data flow.

10. A non-transitory computer-readable storage medium that stores instructions, operable for monitoring a data path extending from an originating node to a terminating node in a network, the instructions causing the originating node to perform the following operations:

receiving, at the originating node from a network controller separated from the data path, a request to monitor at least one network status parameter associated with a particular data flow transported on the data path, and a data flow identifier indicating the particular data flow being one out of a plurality of data flows that can be transported on the data path;

determining from the received request whether a response message comprising the requested at least one network status parameter should be reported to the network controller and if so, transmitting the response message to the network controller;

generating network monitoring data based on the received data flow identifier, wherein the network monitoring data being an operation, administration and maintenance (OAM) packet data unit (PDU), such that the generated network monitoring data is transported on a same data path as the particular data flow, and including the data flow identifier in the network monitoring data, the generated network monitoring data comprising instructions regarding the monitoring of the requested at least one network status parameter; and submitting, to a first subsequent node in the data path, the generated network monitoring data, and wherein in case the first subsequent node is not the terminating node, submitting, from the first subsequent node to a second subsequent node in the data path, the generated network monitoring data.

11. The method of claim 1, the data flow identifier indicating a particular data flow being one out of a plurality of data flows that can be transported on the data path indicates one of an Ethernet, multiprotocol label switching (MPLS), and Internet protocol (IP) data flow.

12. The originating node of claim 5, the node being one of an Ethernet bridge, IP router or data traffic switch.

13. The originating node of claim 5, the data flow identifier indicating a particular data flow being one out of a plurality of data flows that can be transported on the data path indicates one of an Ethernet, multiprotocol label switching (MPLS), and Internet protocol (IP) data flow.

* * * * *